US012698982B1

(12) United States Patent
Shi et al.

(10) Patent No.: US 12,698,982 B1
(45) Date of Patent: Aug. 4, 2026

(54) LASER DEVICE HAVING LASER CALIBRATION FUNCTION AND CALIBRATION METHOD FOR LASER DEVICE

(71) Applicant: NORTHWEST INSTRUMENT INC., Dover, NJ (US)

(72) Inventors: Xin Shi, Shanghai (CN); David Xing, Dover, NJ (US); Hao Li, Shanghai (CN)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 19/416,583

(22) Filed: Dec. 11, 2025

(30) Foreign Application Priority Data

Jul. 25, 2025 (CN) .......................... 202511038044.8

(51) Int. Cl.
G01C 9/06 (2006.01)
G01C 25/00 (2006.01)

(52) U.S. Cl.
CPC .............. G01C 25/00 (2013.01); G01C 9/06 (2013.01); *G01C 2009/066* (2013.01)

(58) Field of Classification Search
CPC ..... G01C 25/00; G01C 9/06; G01C 2009/066
See application file for complete search history.

(56) References Cited

U.S. PATENT DOCUMENTS

| | | | | |
|---|---|---|---|---|
| 11,703,357 | B2 * | 7/2023 | Wang ..................... | G01C 25/00 33/29 |
| 11,859,999 | B2 * | 1/2024 | Shi ........................ | G01C 15/006 |
| 12,460,944 | B2 * | 11/2025 | Shi ......................... | G01C 25/00 |
| 12,566,063 | B2 * | 3/2026 | Shi ......................... | G01B 11/26 |
| 2021/0323087 | A1 * | 10/2021 | Lehmann .............. | B29C 64/393 |
| 2024/0069167 | A1 * | 2/2024 | Song ..................... | G01S 7/4816 |

FOREIGN PATENT DOCUMENTS

| | | | | |
|---|---|---|---|---|
| CN | 116086495 | A | 5/2023 | |
| CN | 219495254 | U | 8/2023 | |
| CN | 222189469 | U | * 12/2024 | |
| CN | 119457631 | A | 2/2025 | |
| CN | 120742312 | A | * 10/2025 | ........... G01S 7/4813 |

* cited by examiner

*Primary Examiner* — Yaritza Guadalupe-Mccall
(74) *Attorney, Agent, or Firm* — Anova Law Group, PLLC

(57) ABSTRACT

A laser device having a laser calibration function includes a housing, a laser emission apparatus, and a calibration apparatus. The housing includes a laser protection cover having a transparent portion. The laser emission apparatus is arranged in the housing and configured to emit a laser. The calibration apparatus is mechanically connected to the laser emission apparatus and includes a transmission member. The transmission member is arranged in the laser device and configured to move along an axial direction of the laser emission apparatus under an external force to calibrate the laser device.

18 Claims, 12 Drawing Sheets

140
142
131
130
110
100
120

240
241
231
230
220
200
210

530    520

531   532

631

620

641     631

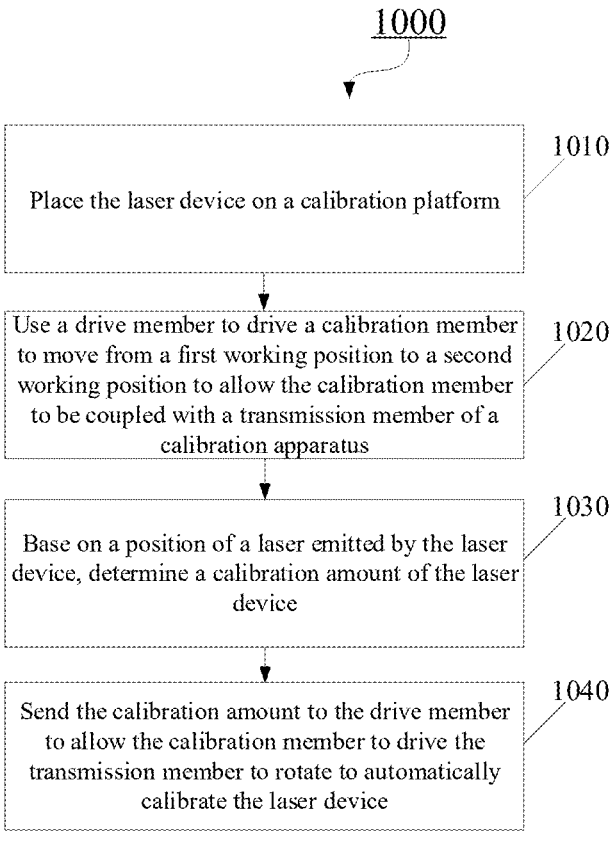

1000

Place the laser device on a calibration platform    1010

Use a drive member to drive a calibration member to move from a first working position to a second working position to allow the calibration member to be coupled with a transmission member of a calibration apparatus    1020

Base on a position of a laser emitted by the laser device, determine a calibration amount of the laser device    1030

Send the calibration amount to the drive member to allow the calibration member to drive the transmission member to rotate to automatically calibrate the laser device    1040

FIG. 10

LASER DEVICE HAVING LASER CALIBRATION FUNCTION AND CALIBRATION METHOD FOR LASER DEVICE

CROSS-REFERENCE TO RELATED APPLICATION

This application claims priority to Chinese Patent Application No. CN202511038044.8, filed on Jul. 25, 2025, the entire contents of which are incorporated herein by reference.

TECHNICAL FIELD

The present disclosure generally relates to the laser surveying field and, more particularly, to a calibration device having a laser calibration function and a calibration method for the laser device.

BACKGROUND

In the field of mapping and surveying, laser equipment is increasingly used nowadays. Among numerous types of laser equipment, a line projector (laser level) is a common tool used for marking horizontal and vertical lines on a target surface. Through a built-in laser emission device and based on optical principles, the laser beam is adjusted into a cross-line shape or diverged into a plane shape through a conical reflector. With the aid of a precise leveling system, it ensures that the projected lines maintain high-precision straightness and mutual perpendicularity in the horizontal and vertical directions. Therefore, it is widely used in fields such as construction engineering, interior decoration, industrial measurement, and engineering surveying.

Laser devices, such as line projectors, during use, may experience unavoidable deviations in their leveling systems due to factors like collisions or drops. The counterweight screws of line projectors available on the market are all positioned on the main body of their core mechanism. If one wishes to adjust a counterweight screw, the outer casing of the product must be opened. Some counterweight screws, due to the obstruction of structural components, require complete disassembly of the core mechanism before adjustment could be made. This not only increases the difficulty of calibration for users but may also introduce further errors. Calibration of such laser devices are therefore inconvenient when it is needed to correct existing errors.

SUMMARY

Embodiments of the present disclosure provide a laser device having a laser calibration function. The laser device includes a housing, a laser emission apparatus, and a calibration apparatus. The housing includes a laser protection cover having a transparent portion. The laser emission apparatus is arranged in the housing and configured to emit a laser. The calibration apparatus is mechanically connected to the laser emission apparatus and includes a transmission member. The transmission member is arranged in the laser device and configured to move along an axial direction of the laser emission apparatus under an external force to calibrate the laser device.

Embodiments of the present disclosure provide a calibration method for the laser device described above. The method includes placing the laser device on a calibration platform; driving, by a drive member, a calibration member to move from a first working position to a second working position to allow the calibration member to be coupled with the transmission member of the calibration apparatus; based on a position of a laser emitted by the laser emission apparatus, determining a calibration amount of the laser device; and sending the calibration amount to the drive member, and driving, by the calibration member, the transmission member to rotate to automatically calibrate the laser device.

BRIEF DESCRIPTION OF THE DRAWINGS

FIG. 10 is a schematic flowchart of a calibration method for a laser device according to some embodiments of the present disclosure.

DETAILED DESCRIPTION OF THE EMBODIMENTS

Embodiments of the present disclosure are described with reference to the accompanying drawings forming a part of the present disclosure. The accompanying drawings show specific embodiments capable of implementing the content of the present disclosure through examples. The exemplary embodiments are not intended to exhaust all possible embodiments of the present disclosure. Without departing from the scope of the present disclosure, other embodiments may be utilized, and structural or logical modifications may be made. Therefore, the following detailed description is not restrictive, and the scope of the present disclosure is defined by the appended claims.

For the technical problems described in the background, the existing laser device calibration operation is complex, and the calibration accuracy is affected by disassembly operations. Thus, the accuracy of the existing laser device is unsatisfactory. To solve these problems in the existing technology, the inventors of the present disclosure have innovatively conceived that, by providing a calibration member, calibration operations can be performed on the laser device outside the laser device without disassembling the laser device. In summary, in the present disclosure, the laser device can be directly calibrated and adjusted without disassembling the laser device. The laser device having the laser calibration method can include a housing, a laser emission apparatus, and a calibration apparatus. A laser protection cover with a transparent portion can be arranged on the housing. The laser emission apparatus can be arranged in the housing and configured to emit laser light. The calibration apparatus can be mechanically connected to the laser emission apparatus. The calibration apparatus can include a transmission member. The transmission member can be arranged in the laser device and configured to move in a direction of the axis of the laser emission apparatus under the external force to calibrate the laser device. In the laser device of embodiments of the present disclosure, since the transmission member is arranged in the laser device and configured to move in the axial direction of the laser emission apparatus under the external force to calibrate the laser device. Then, the transmission member can be operated from the outside of the housing using a tool to operate the calibration apparatus and calibrate the laser device. The axial direction can be the axial direction of the structure where the transmission member is arranged, i.e., the movement direction of the transmission member.

Figure 1:
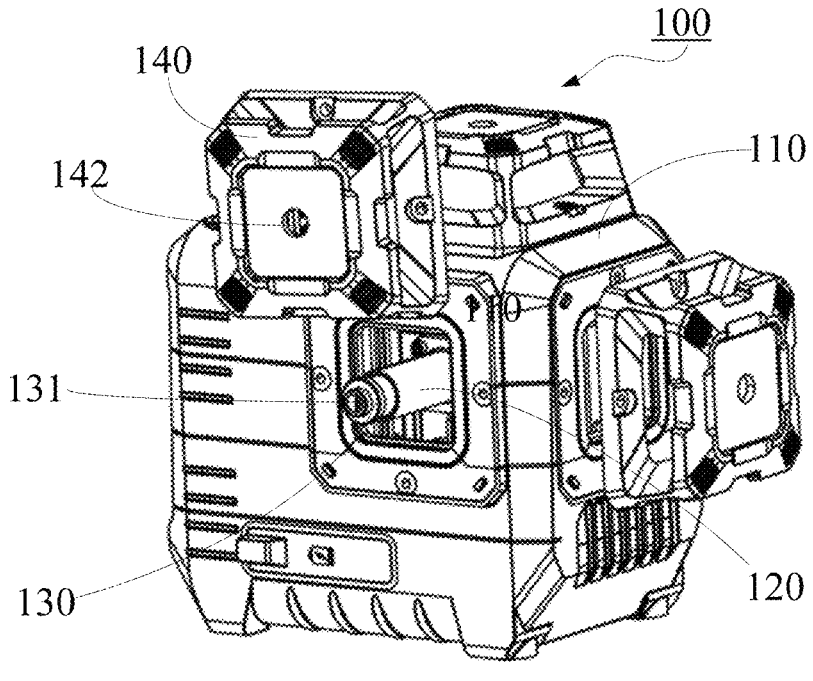
FIG. 1 is a schematic perspective exploded diagram of a laser device according to some embodiments of the present disclosure.
Figure 2:
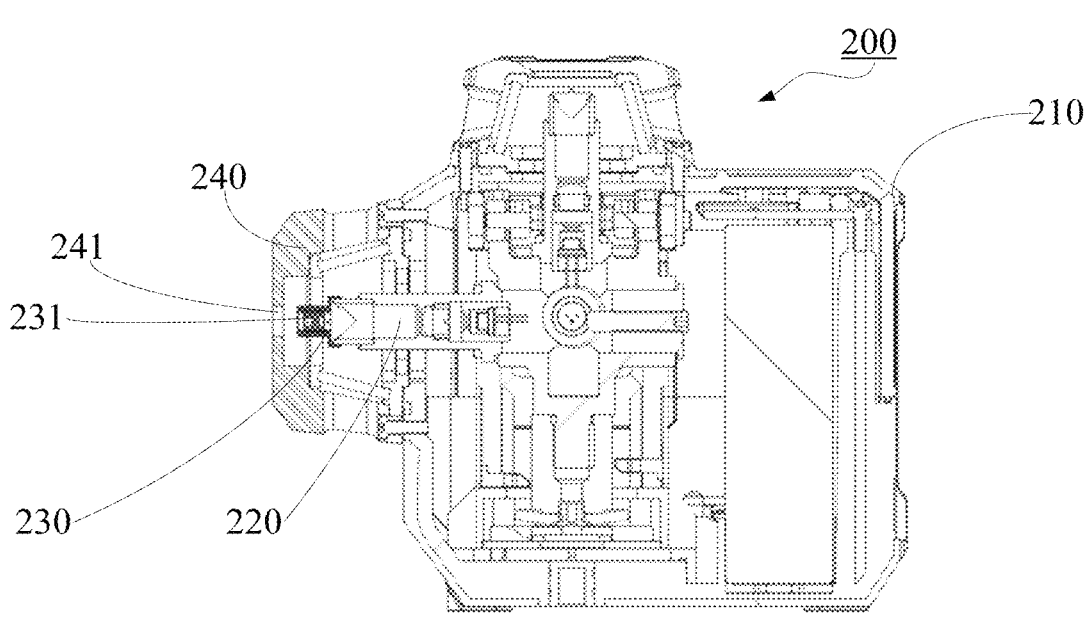
FIG. 2 is a schematic cross-section diagram of a laser device according to some embodiments of the present disclosure.
Figure 3A:
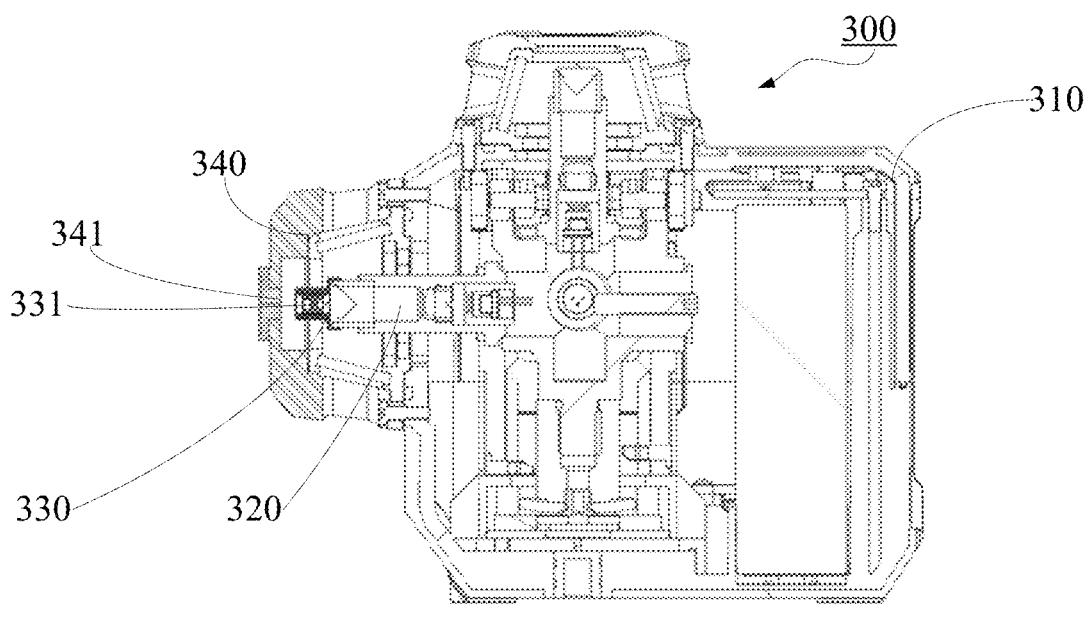
FIGS. 3A, 3B, and 3C are schematic cross-section diagrams of a laser device according to some embodiments of the present disclosure.
Figure 3B:
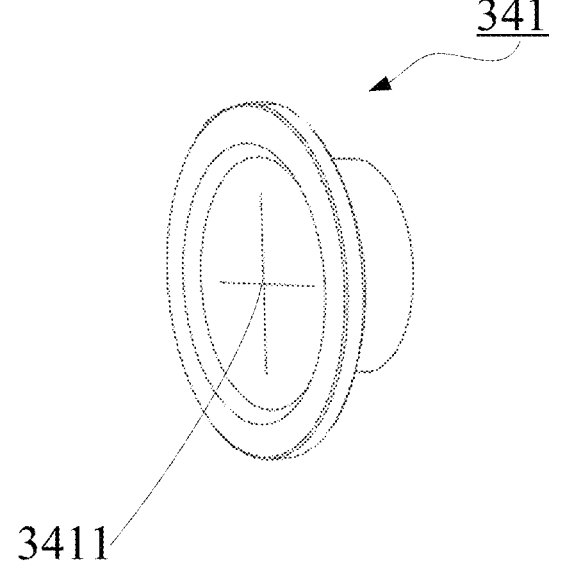
Figure 3C:
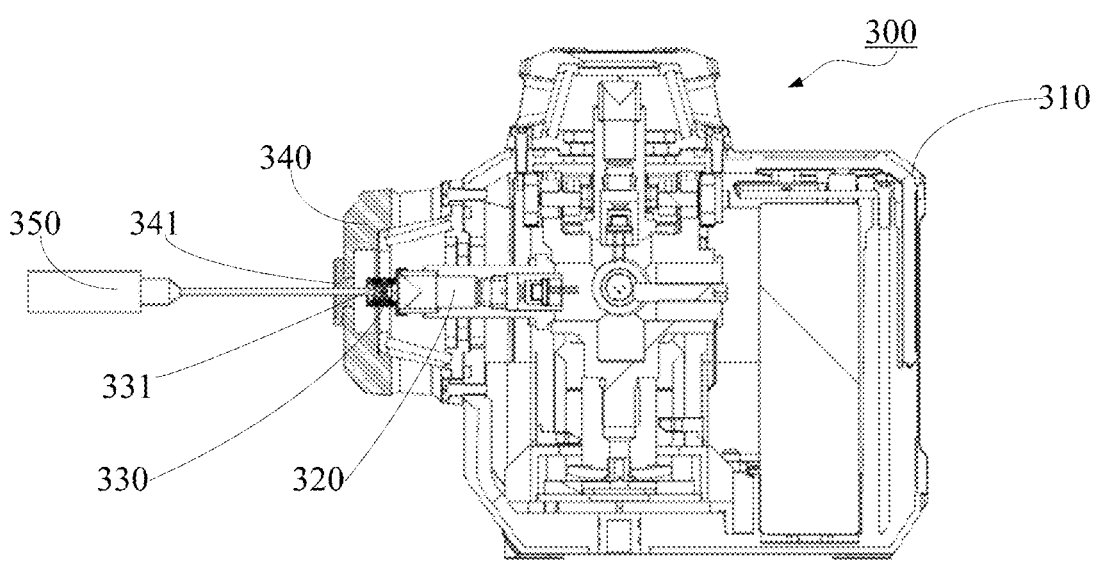
Figure 4A:
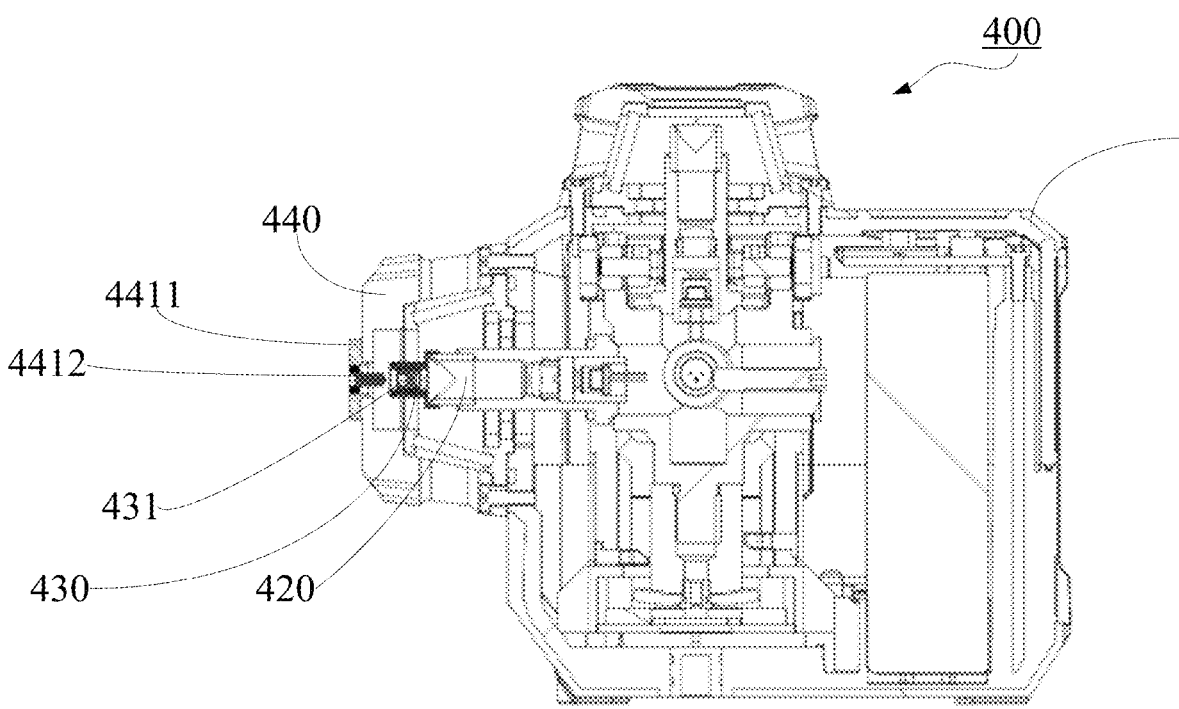
FIG. 4A is a schematic cross-section diagram of a calibration member of a laser device located at a first working position according to some embodiments of the present disclosure.
Figure 4B:
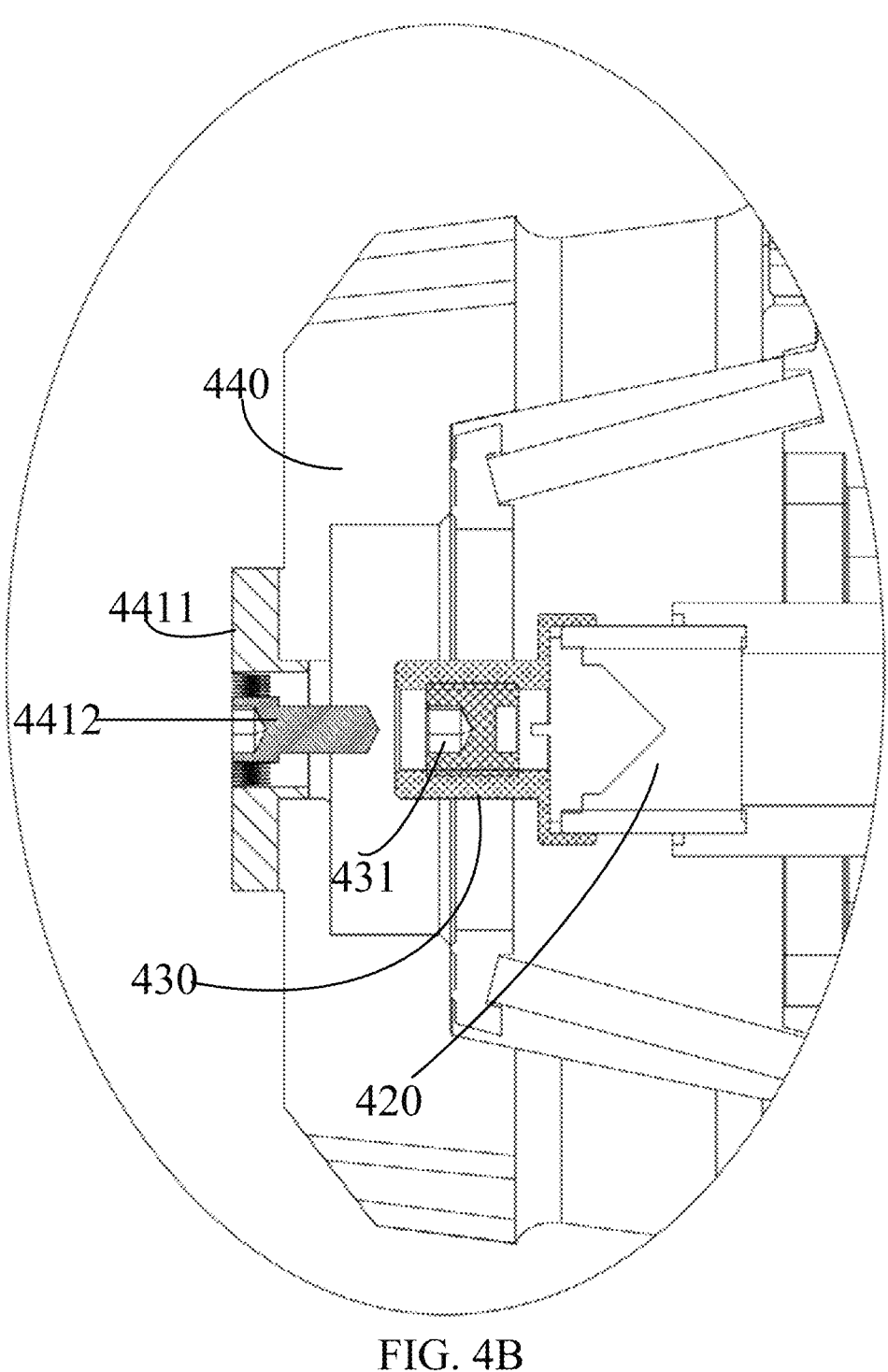
FIG. 4B is an enlarged view of a part of FIG. 4A.
Figure 4C:
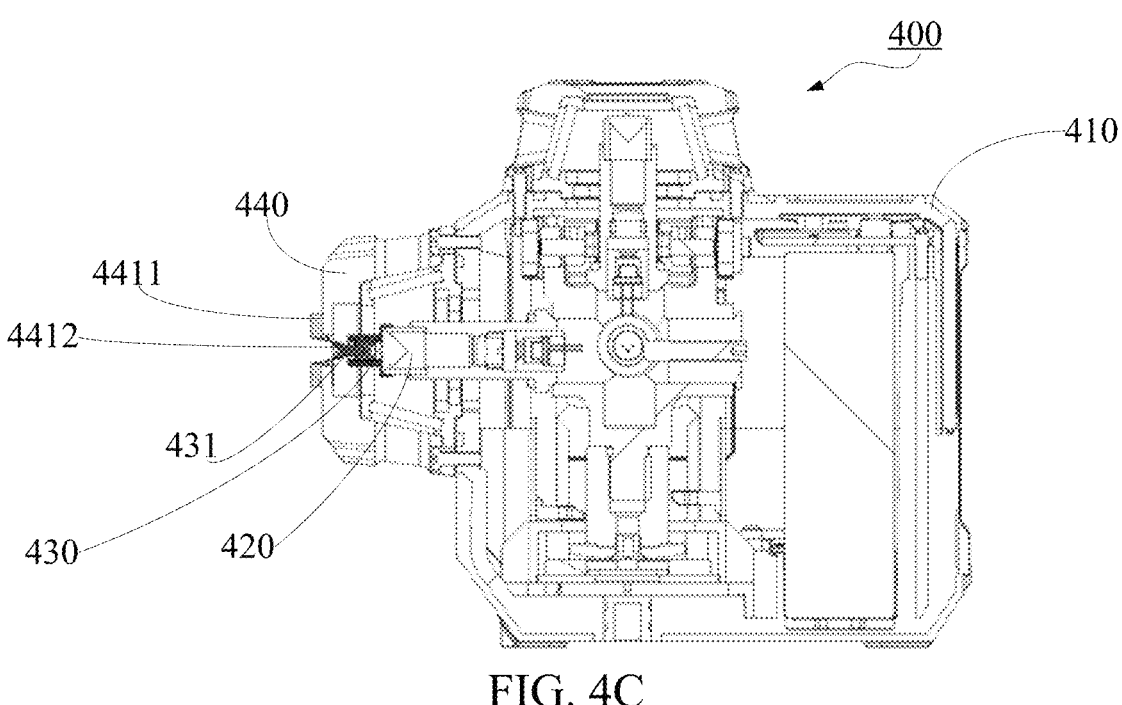
FIG. 4C is a schematic cross-section diagram of a calibration member of a laser device located at a second working position according to some embodiments of the present disclosure.
Figure 4D:
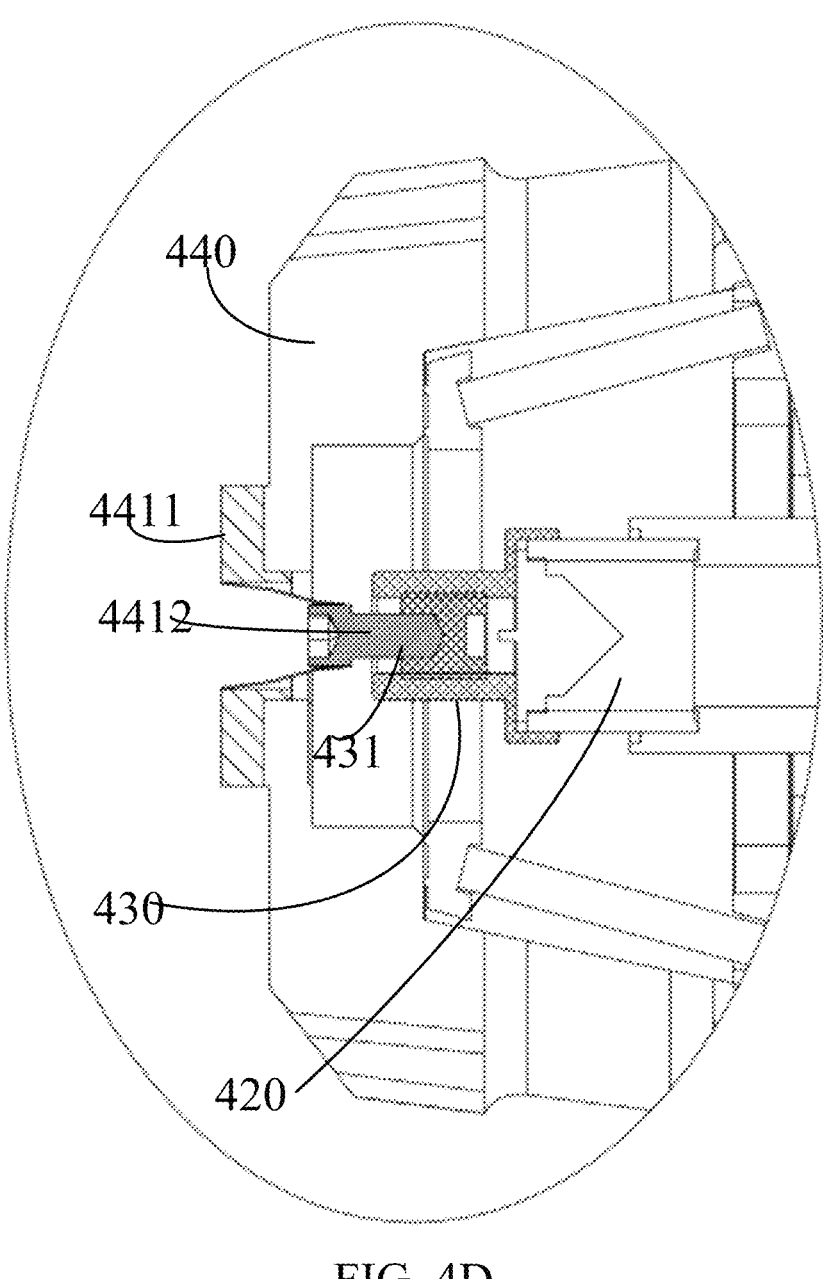
FIG. 4D is an enlarged view of a part of FIG. 4C.
Figure 5:
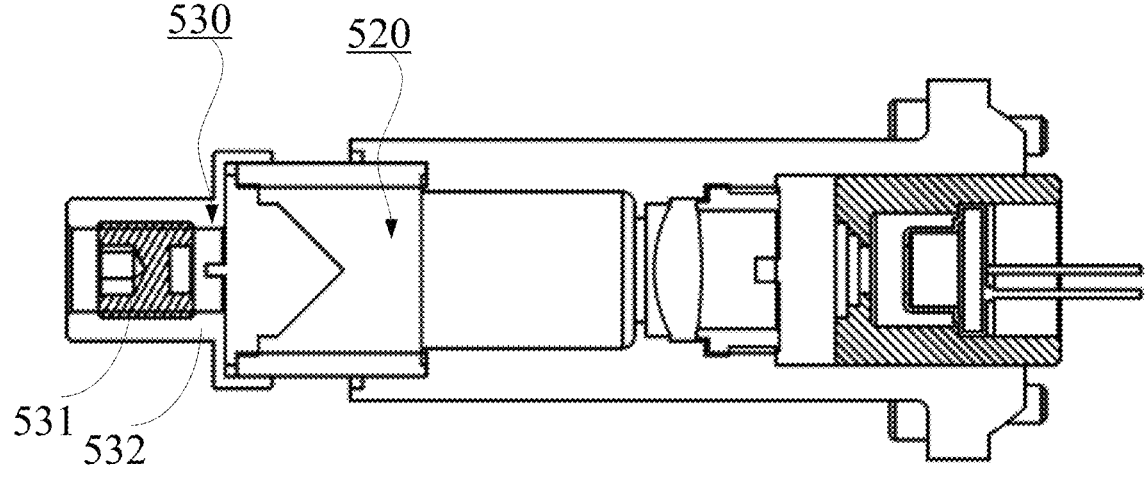
FIG. 5 is a schematic diagram showing a laser emission apparatus being coupled to a transmission member according to some embodiments of the present disclosure.
Figure 6A:
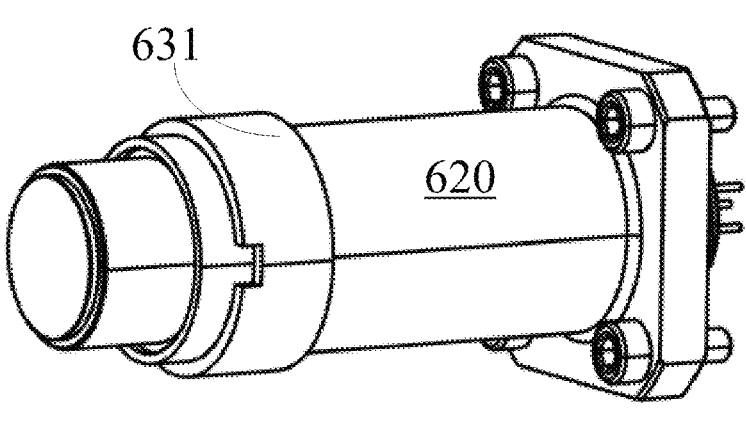
FIGS. 6A and 6B are schematic diagrams showing a laser emission apparatus being coupled to a transmission member according to some other embodiments of the present disclosure.
Figure 6B:
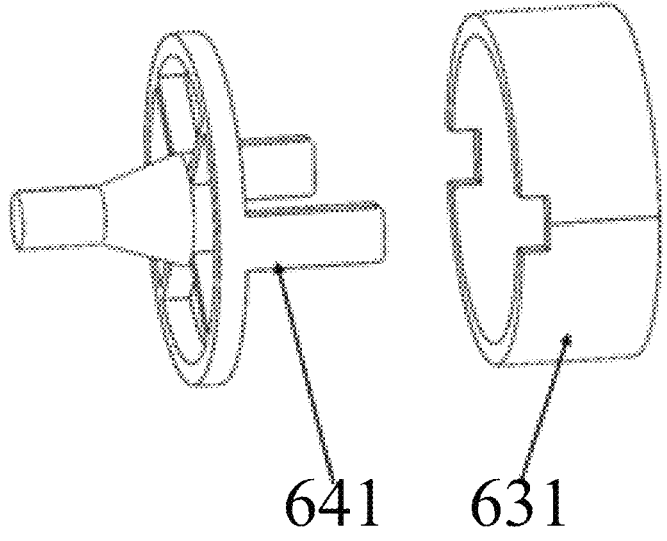
Figure 7:
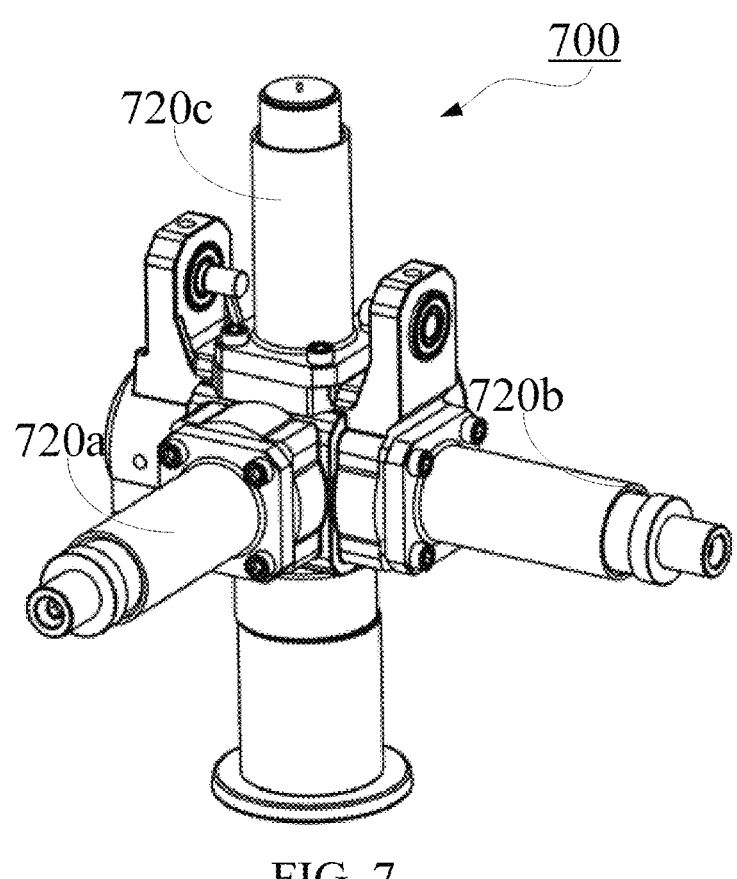
FIG. 7 is a schematic perspective diagram of a cassette mechanism of a laser device according to some embodiments of the present disclosure.
Figure 8:
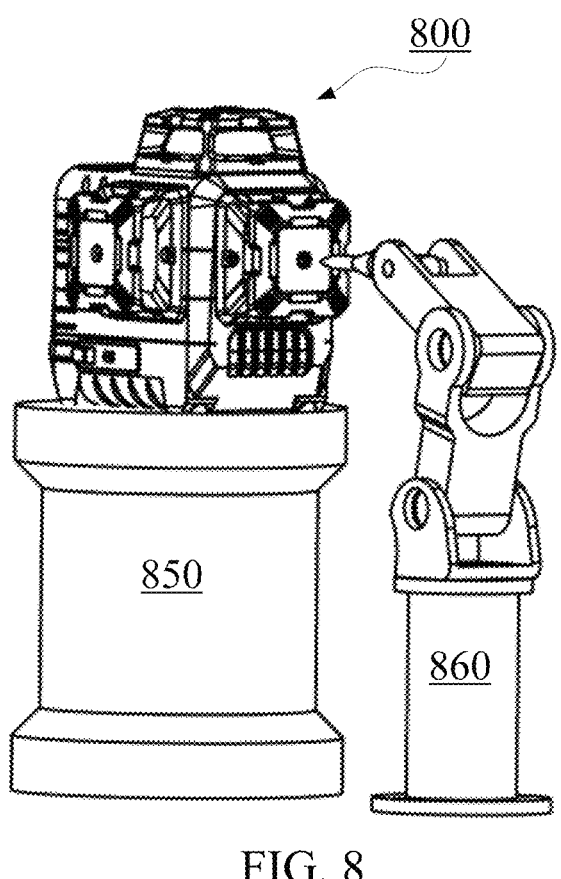
FIG. 8 is a schematic diagram of a laser system according to some embodiments of the present disclosure.
Figure 9:
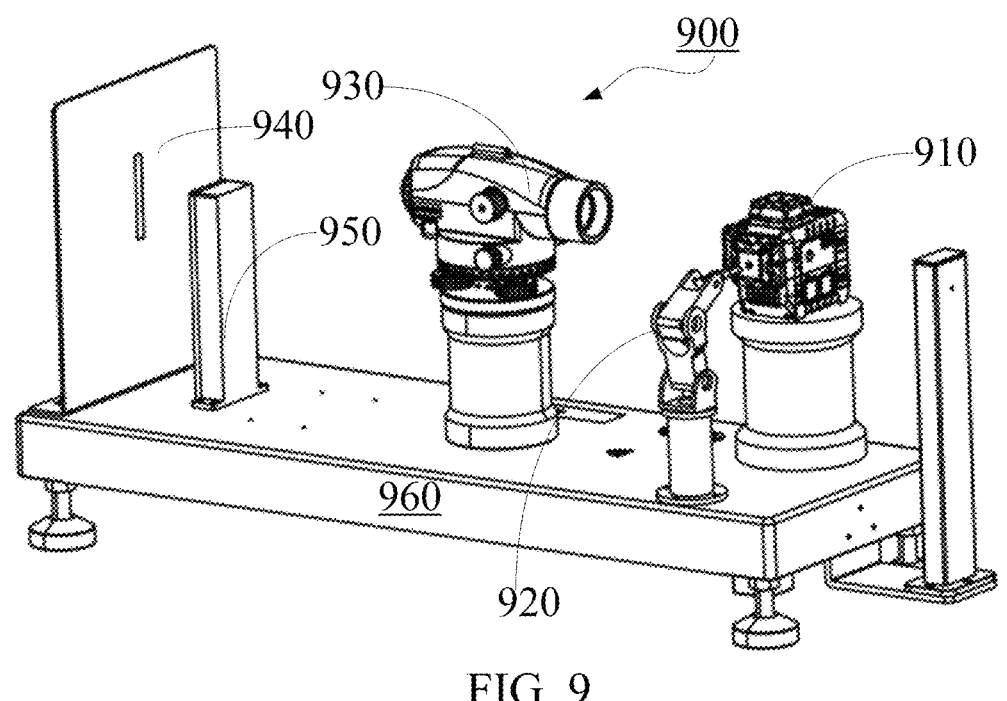
FIG. 9 is a schematic diagram of another laser system according to some embodiments of the present disclosure.

The laser device and the calibration method for the laser device of embodiments of the present disclosure are described in detail in connection with FIG. 1 to FIG. 10. FIG. 1 is a schematic perspective exploded diagram of the laser device 100 according to some embodiments of the present disclosure. FIG. 2 is a schematic cross-section diagram of the laser device 200 according to some embodiments of the present disclosure. FIGS. 3A, 3B, and 3C are schematic cross-section diagrams of the laser device 300 according to some embodiments of the present disclosure. FIG. 4A is a schematic cross-section diagram of a calibration member of the laser device 400 located at a first working position according to some embodiments of the present disclosure. FIG. 4B is an enlarged view of a part of FIG. 4A. FIG. 4C is a schematic cross-section diagram of a calibration member of the laser device 400 located at a second working position according to some embodiments of the present disclosure. FIG. 4D is an enlarged view of a part of FIG. 4C. FIG. 5 is a schematic diagram showing a laser emission apparatus being coupled to a transmission member according to some embodiments of the present disclosure. FIGS. 6A and 6B are schematic diagrams showing a laser emission apparatus being coupled to a transmission member according to some other embodiments of the present disclosure. FIG. 7 is a schematic perspective diagram of a cassette mechanism 700 of a laser device according to some embodiments of the present disclosure. FIG. 8 is a schematic diagram of a laser system 800 according to some embodiments of the present disclosure. FIG. 9 is a schematic diagram of another laser system 900 according to some embodiments of the present disclosure. FIG. 10 is a schematic flowchart of a calibration method 1000 for a laser device according to some embodiments of the present disclosure.

As shown in FIG. 1, the laser device 100 includes a housing 110, a laser emission apparatus 120, and a calibration apparatus 130. The housing 110 includes a laser protection cover 140 having a transparent member. The laser emission apparatus 120 is arranged in the housing 110 and configured to emit a laser. The calibration apparatus 130 is mechanically connected to the laser emission apparatus 120. The calibration apparatus 130 includes a transmission member 131. The transmission member 131 is arranged in the laser device 100 and moves in the axial direction of the laser emission apparatus 120 under an external force to calibrate the laser device 100. The axial direction can be a direction along the longitudinal axis of the laser emission apparatus 120 and perpendicular to the housing surface extended by the laser emission apparatus 120. In the laser device 100 having the laser calibration function of embodiments of the present disclosure, the transmission member 131 can be arranged in the laser device 100 and configured to move along the axial direction of the laser emission apparatus 120 under the external force to calibrate the laser device 100. Thus, the tool can be used to operate the transmission member 131 from the outside of the housing 110 to operate the calibration apparatus 130 to calibrate the laser device 100.

To facilitate operation, in embodiments of the present disclosure, a through-hole can be arranged at the laser protection cover 140. Then, the tool can penetrate the through-hole to enter the housing of the laser device to operate the transmission member and calibrate the laser device. FIG. 2 is a schematic cross-section diagram of the laser device 200 according to some embodiments of the present disclosure. As shown in FIG. 2, the laser device 200 includes a housing 210, wherein a laser protective cover 240 having a transparent portion is disposed on the housing 210, a laser emission apparatus 220, and a calibration apparatus 230. A laser protection cover 240 having a transparent portion is arranged at the housing 210. The laser emission apparatus 220 is arranged in the housing 210 and configured to emit a laser. The calibration apparatus is mechanically connected to the laser emission apparatus 220. The calibration apparatus 230 includes a transmission member 231. The transmission member 231 is arranged in the laser device 200 and moves along the axial direction of the laser emission apparatus 220 under the external force to calibrate the laser device 200. The axial direction can be a direction along the longitudinal axis of the laser emission apparatus 220 and perpendicular to the housing surface extended by the laser emission apparatus 220. In addition, as shown in FIG. 2, a through-hole 241 is formed at the laser protection cover 240 to allow a tool such as a screw driver to pass through the through-hole 241 to operate the transmission member 231.

In addition to the through-hole, other members can also be provided. For example, an elastic piece such as a rubber plug can be provided. In summary, in embodiments of the present disclosure, the laser device further includes the elastic piece. The elastic member can have a slit and be arranged at the through-hole to facilitate the tool to be inserted from the slit into the housing of the laser device to calibrate the laser device and improve the waterproof level. FIGS. 3A, 3B, and 3C are schematic cross-section diagrams of the laser device 300 according to some embodiments of the present disclosure. As shown in FIGS. 3A, 3B, and 3C, the laser device 300 includes a housing 310, a laser emission apparatus 320, and a calibration apparatus 330. The housing 310 includes a laser protection cover 340 having a transparent portion. The laser emission apparatus 320 is arranged in the housing 310 and configured to emit a laser. The calibration apparatus 330 is mechanically connected to the laser emission apparatus 320. The calibration apparatus 330 includes a transmission member 331. The transmission member 331 is arranged in the laser device 300 and moves along the axial direction of the laser emission apparatus 320 under the external force to calibrate the laser device 300. The axial direction can be the direction along the longitudinal axis of the laser emission apparatus 320 and perpendicular to the housing surface extended by the laser emission apparatus 320. In addition, as shown in FIGS. 3A, 3B, and 3C, an elastic piece 341 is arranged at the laser protection cover 340. A slit 3411 is formed at the middle portion of the elastic piece 341 to allow the tool, such as a screw driver, to pass through the slit 3411 to operate the transmission member 331. FIG. 3C illustrates a screw driver 350, which is able to pass through the slit 3411 to operate the transmission member 331.

Of course, in some other embodiments, the slit is not necessarily provided at the elastic piece 341. FIG. 4A is a schematic cross-section diagram of a calibration member of a laser device 400 located at a first working position according to some embodiments of the present disclosure. FIG. 4B is an enlarged view of a part of FIG. 4A. FIG. 4C is a schematic cross-section diagram of the calibration member of the laser device 400 located at a second working position according to some embodiments of the present disclosure. FIG. 4D is an enlarged view of a part of FIG. 4C. As shown in FIGS. 4A, 4B, 4C and 4D, in embodiments of the present disclosure, the laser device 400 includes a housing 410, a laser emission apparatus 420, and a calibration apparatus 430. The housing 410 includes a laser protection cover 440 having a transparent portion. The laser emission apparatus 420 is arranged in the housing 410 and configured to emit a laser. The calibration apparatus is mechanically connected to the laser emission apparatus 420. The calibration apparatus 430 includes a transmission member 431. The transmission member 431 is arranged in the laser device 400 and moves along the axial direction of the laser emission apparatus 420 under the external force to calibrate the laser device 400. The axial direction can be the direction along the longitudinal axis of the laser emission apparatus 420 and perpendicular to the housing surface extended by the laser emission apparatus 420. As shown in FIGS. 4A and 4B, the laser device 400 further includes calibration members 4411 and 4412. The calibration members 4411 and 4412 are arranged at the laser protection cover 440 of the housing 410 and have the first working position (FIGS. 4A and 4B) and the second working position (FIGS. 4C and 4D). In some embodiments, the through-hole 421 of FIG. 1 is arranged at the laser protection cover 440. The calibration member 441 is arranged at the through-hole 420. A part of the calibration member 441 is arranged outside of the through-hole 142, and another part of the calibration member is arranged inside the through-hole 142. When the calibration member 441 is arranged at the first working position, the calibration members 4411 and 4412 are decoupled from the transmission member 431. When the calibration members 4411 and 4412 are at the second working position, the calibration members 4411 and 4412 are decoupled from the transmission member 431. In the laser device 400 of embodiments of the present disclosure, the calibration members 4411 and 4412 arranged at the protection cover 440 of the housing 410 can be adjusted from the outside of the laser device 400 without disassembling the laser device 400. For example, the screw driver can be configured to drive the calibration members 4411 and 4412 to move from the first working position (FIGS. 4A and 4B) to the second working position (FIGS. 4C and 4D). At the second working position, the transmission member 431 overlaps with a front/tip portion of the calibration member 4412 in the views shown in FIGS. 4C and 4D. The transmission member 431 located inside the laser device 400 can be operated to move by the calibration members 4411 and 4412 to perform the calibration operation. Then, the calibration operation can be facilitated when the laser device 400 needs to be calibrated, and no additional deviation can be resulted due to the calibration operation. With the laser device 400 of embodiments of the present disclosure, the calibration operation can be facilitated, and a very high accuracy can be achieved.

In one embodiment of the present disclosure, in order to conveniently realize the position adjustment and holding of the calibration members 4411 and 4412, a calibration member can include two parts, i.e., an elastic member 4411 and a connector 4412. The elastic member 4411 can be configured to maintain the calibration member (e.g., the connector 4412) at the first working position when calibration is not required. Then, the connector 4412 of the calibration member is not coupled with the transmission member 431. When calibration is needed, an automatic or manual tool can be used to drive the connector 4412 of the calibration member to overcome the elastic force of the elastic member 4411 and move the connector 4412 toward the transmission member 431, so that the connector 4412 of the calibration member moves from the first working position to the second working position to couple with the transmission member 431. Under the external fore, the transmission member 431 can be driven to rotate by the connector 4412 to cause the transmission member 431 to move inside the calibration apparatus 430. The position of the gravity center can change to calibrate the laser device 400. In summary, in embodiments of the present disclosure, the calibration member can include an elastic member 4411. The elastic member 4411 can cause a portion (e.g., connector 4412) of the calibration member to be maintained at the first working position, i.e., a position without touching the transmission member 431 to avoid misoperation. In embodiments of the present disclosure, the calibration member further includes the connector 4412 connected to the elastic member 4411. When the external force is applied at the connector 4412 to cause the connector 4412 to overcome the elastic force of the elastic member 4411 to move, the connector 4412 can move from the first working position to the second working position to be coupled with the transmission member. Thus, when the calibration is needed, the position of the hard connector 4412 of the calibration member, such as a metal connector 4412 or plastic connector 4412, can be adjusted to allow the connector 4412 to be coupled with the transmission member 431. Then, the laser device 400 can be calibrated. In some embodiments, the elastic member 4411 can be a spring or a rubber piece. Then, the elastic member 4411 described in embodiments of the present disclosure can be realized with a relatively low cost. The elastic member 4411 can be used by the user of the laser device 400 to calibrate the laser device 400. When the elastic member 4411 is a rubber piece, the rubber piece can cover the surface of the connector 4412. The automatic tool or manual tool can be operated directly at the rubber piece. The connector 4412 can also be arranged at the middle portion of the rubber piece. The automatic tool or manual tool can be operated directly at the connector 4412.

FIG. 5 illustrates a schematic structural diagram of the transmission member of embodiments of the present disclosure. In embodiments of the present disclosure, a calibration apparatus 530 includes a sleeve 532 and a transmission member 531. The sleeve 532 is mechanically connected to the laser emission apparatus 520. For example, the sleeve 532 is sleeved at an end of the laser emission apparatus 520 close to the laser protection cover 540. The transmission member 531 is arranged in the sleeve 532, and the outer surface of the transmission member 531 is threadedly connected to the inner surface of the sleeve 532. Then, when the calibration member 541 is coupled with the transmission member 531, with the rotation of the calibration member 541, the transmission member 531 can have displacement relative to the axial direction of the sleeve 532 of the calibration apparatus 530 (e.g., longitudinal displacement) to calibrate the laser emission apparatus. In some embodiments, FIG. 5 is a schematic diagram showing the laser emission apparatus being coupled to the transmission member according to some embodiments of the present disclosure. FIGS. 6A and 6B are schematic diagrams showing the laser emission apparatus being coupled to the transmission member according to some other embodiments of the present disclosure. In embodiments shown in FIG. 5, the transmission member 531 is, for example, implemented as a counterweight screw, such as a hexagonal screw or a cross screw with external threads. The end of the transmission member 531 facing the housing of the laser device is provided with a mechanical cooperation structure. The mechanical cooperation structure mechanically cooperates with the calibration member to realize connection and calibrate the laser device. In some embodiments, when the connector of the calibration member is driven to the second working position, the connector can be coupled with the transmission member 531 to allow the transmission member 531 to rotate with the connector of the calibration member. For example, when the transmission member 531, as the counterweight screw, has an outer thread, the transmission member 531 can move in the sleeve 532 to change the position of the counterweight of the laser emission apparatus 520 to calibrate the laser device.

In embodiments of the present disclosure, the transmission member 631 can be sleeved at the outer surface of the laser emission apparatus 620. At two snap members can be arranged at a side of the transmission member 631 facing the laser protection cover. A member cooperating with the snap member can be arranged at the calibration member. As shown in FIG. 6A and FIG. 6B, the transmission member 631 has an annular structure. The transmission member 631 is sleeved at the laser emission apparatus 620. At least two concave openings are arranged at the side of the annular structure facing the laser protection cover. Correspondingly, the calibration member cooperating with the transmission member 631 can have convex structures cooperating with the concave openings. Correspondingly, the annular structure can include, e.g., an inner thread. In summary, in embodiments of the present disclosure, the transmission member 631 can be sleeved at the axial position at the side surface of the laser emission apparatus. The transmission member is configured as a barrel-shaped structure having mechanical mating members at the end portion and having inner threads. The outer thread can be provided to the outer surface at the axial direction of the laser emission device to allow the transmission member to be connected to the laser emission apparatus through a thread connection. Thus, the calibration member can be configured at the laser protection cover and have the first working position (and the second working position). When the calibration member is at the first working position, the calibration member can be decoupled from the transmission member. When the calibration member is at the second working position, the calibration member can be coupled with the transmission member. In some embodiments, when the convex structure of the calibration member is coupled with the concave opening arranged at the transmission member, and as the automatic tool or manual tool such as a screw driver functions at the screw hole of the calibration member to drive the calibration member to rotate, the transmission member can move relative to the axial direction of the laser emission apparatus to calibrate the laser device.

The concave opening can be exemplary not restrictive. For example, in embodiments of the present disclosure, a threaded hole can be arranged at an end of the calibration member facing the outer side of the housing. The threaded hole can be a slotted opening, a cross-shaped opening, or a hexagonal opening. Then, traditional flathead screwdrivers, Phillips screwdrivers, or hex keys or wrenches to operate the calibration member from outside of the laser device to calibrate the transmission member and the laser emission apparatus connected to the transmission member.

In embodiments of the present disclosure, the laser device can further include a level indication apparatus, such as a bubble. The level indication apparatus can be configured to indicate the current horizontal state of the laser device.

Of course, the above embodiment only shows a calibration apparatus. However, for the laser device, a plurality of laser emission apparatuses can be provided. For example, two laser emission apparatuses can emit lasers in the X-axis direction and the Y-axis direction, respectively. Each laser emission apparatus can, for example, be provided with one level calibration apparatus. FIG. 7 is a schematic perspective diagram of a cassette mechanism of a laser device 700 according to some embodiments of the present disclosure. The laser device 700 shown in FIG. 7 includes, for example, three laser emission apparatuses 720a, 720b, and 720c. in summary, in embodiments of the present disclosure, the calibration apparatus includes a first calibration apparatus and a second calibration apparatus. The calibration member includes a first calibration member and a second calibration member, the first calibration member can be configured to adjust the horizontal state of the first calibration apparatus. The second calibration member can be configured to adjust the horizontal state of the second calibration apparatus. In embodiments of the present disclosure, the first calibration member can be configured to adjust the horizontal state of the X-axis direction of the laser device. The second calibration member can be configured to adjust the horizontal state of the Y-axis direction of the laser device. Thus, when the laser device needs to be calibrated, the laser device can be calibrated in different dimensions.

In embodiments of the present disclosure, the laser device can include a laser line projector, a laser level, or a laser total station.

FIG. 8 shows a calibration system including a drive member 860 and a support platform 850. In addition to the above two members, the calibration system further includes the laser device of embodiments of the present disclosure. The laser device is arranged on the support platform 850. Then, the drive member 860 is configured to assist calibration. Then, the calibration can be automatic or manual.

Further, the present disclosure also discloses a calibration system having a calibration platform. FIG. 9 is a schematic diagram of another laser system 900 according to some embodiments of the present disclosure. In embodiments shown in FIG. 9 of the present disclosure, a laser device 910 is arranged on a calibration platform 960. The laser emitted from the laser device 910 irradiates a reticle 940 after passing through an optical path extension apparatus 930, such as a level instrument. The calibration system 900 of the present disclosure includes a base platform 960. The base platform 960 can be configured to support the laser device 910 that is to be mounted on the base platform 960 at the first position. In addition, the calibration system 900 further includes a target 940 (e.g., the reticle 940). The reticle 940 can be arranged at the second position of the base platform 960 and configured to receive the laser. The calibration system 900 further includes an evaluation apparatus 950. The evaluation apparatus 950 can be configured to obtain a projected at the reticle 940 by the laser and determine the positions of the laser at the reticle 940 before and after rotating for a first angle emitted by the laser device 910 to determine the deviation distance. The evaluation apparatus 950 can be further configured to, based on the deviation distance, the distance data determined according to the position data of the first position and the second position, and the first angle, determine whether the laser device 910 needs to be calibrated. In embodiments of FIG. 9, the evaluation apparatus 950 can be arranged at the third position on the side of the reticle 940 facing the laser device 910 to allow the evaluation apparatus 950 to easily recognize the position of the laser on the reticle 940 to improve the recognition accuracy. The base platform 960 further includes a rotation apparatus (e.g., right under the laser device 910). The rotation apparatus can be configured to rotate the laser device 910 for the first angle based on the control instruction received from the evaluation apparatus 950. The rotation angle of the laser device 910 can be controlled with higher accuracy. In embodiments of the present disclosure, the first angle can be an angle of 180 degrees, 90 degrees, or 270 degrees. Thus, those skilled in the art should know that the three angles are merely exemplary, not restrictive. These angles are easy for calculating the calibration parameters, and other angles can also achieve the purpose of calibration. Thus, the technical solutions with other angles are also included in the scope of the technical solution protected by the independent claims. In embodiments of the present disclosure, when the evaluation apparatus determines that the laser device needs to be calibrated, the evaluation apparatus can determine the calibration amount such as a calibration signal based on the distance data, the deviation distance and the first angle, and send the calibration amount to the drive member 920.

The optical path extension apparatus 930 further includes a crosshair reticle plate. The crosshair reticle plate can be arranged between a focusing lens of an objective lens and an eyepiece and configured to perform auxiliary alignment of the laser. The evaluation apparatus 950, for example, can be implemented as a smartphone, particularly the camera of the smartphone. Based on the captured image, the evaluation apparatus 950 can recognize the specific position of the laser emitted by the laser emission apparatus, perform evaluation on determining whether the laser device 910 needs to be calibrated based on the position data, and send the evaluation result and the corresponding calibration amount to the drive member 920. Then, the evaluation apparatus 950 and the laser device 910 can have a wired or wireless connection. The wired or wireless connection can be used to transmit the calibration signal from the evaluation apparatus 950 to the laser device 910. In some embodiments of the present disclosure, the wireless connection can include at least one of an infrared connection, Bluetooth connection, or WiFi connection. The drive member 920 can drive the electrical screw to about against the calibration member to cause the calibration member to be mechanically connected to the transmission member. Thus, the rotation of the electrical screw can drive the transmission member to rotate to cause the position of the transmission member to change relate to the laser emission apparatus to realize calibration and self-calibration. Of course, these devices, for example, can be arranged on one automatic calibration platform 960 to realize the miniaturization and high precision of the calibration platform. When the calibration is performed, the present disclosure further provides a calibration method 1000 applied to the laser device. The calibration member 1000 includes the following steps.

At 1010, the laser device is arranged on the calibration platform.

At 1020, the drive member is configured to drive the calibration member to move from the first working position to the second working position to cause the calibration member to be coupled with the transmission member of the calibration apparatus.

At 1030, based on the position of the laser emitted by the laser device, the calibration amount of the laser device is determined.

At 1040, the calibration amount is sent to the drive member to allow the calibration member to drive the transmission member to rotate to automatically calibrate the laser device.

In the calibration method applied to the laser device of embodiments of the present disclosure, the calibration member arranged at the protection cover of the housing can be adjusted from the outside of the laser device without disassembling the laser device. For example, the calibration member can be driven to move from the first working position to the second working position. Thus, the transmission member inside the laser device can be operated by the calibration member to perform the calibration operation. Then, when the laser device needs to be calibrated, the automatic calibration operation can be performed. The calibration operation may not bring additional deviation. Therefore, the laser device of embodiments of the present disclosure can be easily operated and has high precision.

In embodiments of the present disclosure, the calibration method can further include, after the calibration is completed in the first direction, the laser device can be rotated for a first angle to calibrate the laser device in the second direction. The first direction can be perpendicular to the second direction. For example, when the deviation of the laser positions of the laser radiating at the reticle before or after in the first direction is smaller than the determined value, the calibration in the first direction can be completed. Then, the calibration can be performed in the second direction.

In embodiments of the present disclosure, the drive member can be configured as a mechanical arm. The calibration method can further include, performing the automatic calibration, by the mechanical arm, on the laser device based on the calibration amount. In the calibration method of the present disclosure, the mechanical arm can be configured to perform the automatic calibration. Of course, the tool such as a screw driver can also be used to manually perform the calibration.

In the above embodiments, the calibration can be performed based on the position of the laser emitted by the laser emission apparatus. In addition, the calibration can be performed by the level indication apparatus such as bubble mechanically connected to the laser emission apparatus. Then, in embodiments of the present disclosure, the laser device can further include the level indication apparatus. The calibration method can include, based on the level indication apparatus, using the drive member to perform automatic calibration on the laser device. In the calibration method of the present disclosure, the level indication apparatus can be used for a second calibration to further improve the calibration precision.

In the laser device and the calibration method applied to the laser device of embodiments of the present disclosure, the transmission member can be arranged in the laser device and move along the axial direction of the laser emission apparatus under the external force to calibrate the laser device. Then, the transmission member can be operated by the tool from outside of the housing to operate the calibration apparatus to calibrate the laser device. Then, the laser device can be facilitated to perform calibration operation in real-time when the calibration is needed, and no additional deviation may be provided due to the calibration operation. Thus, with the laser device of the present disclosure, the calibration operation can be facilitated with high precision.

Although different exemplary embodiments of the present disclosure have been described, it is apparent to those skilled in the art that various changes and modifications can be made. One or some advantages of the present disclosure can be realized without departing from the spirit and scope of the present disclosure. For those skilled in the art, other members performing the same functions may be appropriately substituted. The features described according to the specific drawings can be grouped with features of other drawings, even in the situation where the combination is not explicitly described. In addition, the method of the present disclosure can be implemented in a software method using appropriate processor instructions or in a mixing implementation method using the combination of the hardware logic and software logic to obtain the same result. The modifications to the solution of the present disclosure are within the scope of the appended claims.

What is claimed is:

1. A laser device having a laser calibration function, comprising:
   a housing including a laser protection cover having a transparent portion;
   a laser emission apparatus arranged in the housing and configured to emit a laser;
   a calibration apparatus mechanically connected to the laser emission apparatus and including a transmission member, the transmission member being arranged in the laser device and configured to move along an axial direction of the laser emission apparatus under an external force to calibrate the laser device.

2. The laser device having the laser calibration function according to claim 1, wherein a through-hole is formed on the laser protection cover.

3. The laser device having the laser calibration function according to claim 2, further comprising:
   an elastic piece including a slit, the slit being arranged at the through-hole.

4. The laser device having the laser calibration function according to claim 1, further comprising:
   a calibration member arranged at the laser protection cover of the housing and having a first working position and a second working position;
   wherein:
      in response to the calibration member being in the first working position, the calibration member is decoupled from the transmission member; and
      in response to the calibration member being in the second working position, the calibration member is coupled with the transmission member.

5. The laser device having the laser calibration function according to claim 4, wherein the calibration member includes an elastic member configured to maintain a portion of the calibration member in the first working position.

6. The laser device having the laser calibration function according to claim 5, wherein:
   the calibration member further includes a connector connected to the elastic member;
   the connector is configured to move, in response to an external force being applied to the connector to allow the connector to overcome an elastic force of the elastic member to move, from the first working position to the second working position to be coupled with the transmission member.

7. The laser device having the laser calibration function according to claim 5, wherein the elastic member is configured as a spring or a rubber piece.

8. The laser device having the laser calibration function according to claim 1, wherein:
   the calibration apparatus further includes a sleeve mechanically connected to the laser emission apparatus;
   the transmission member is arranged in the sleeve; and
   an outer surface of the transmission member is threadedly connected to an inner surface of the sleeve.

9. The laser device having the laser calibration function according to claim 1, wherein:
   the transmission member is arranged at an axial position on a side surface of the laser emission apparatus;
   the transmission member is configured to have a barrel structure with an end having a mechanical cooperation piece and having an inner thread; and
   an outer thread is formed on the side surface of the laser emission apparatus to allow the transmission member and the laser emission apparatus to be threadedly connected.

10. The laser device having the laser calibration function according to claim 1, wherein a slot-shaped opening, a cross-shaped opening, or a hexagonal-shaped opening are formed on an end of the calibration member facing an outer side of the housing.

11. The laser device having the laser calibration function according to claim 1, further comprising:
   a level indication apparatus configured to indicate a current horizontal state of the laser device having the laser calibration function.

12. The laser device having the laser calibration function according to claim 1, wherein:
   the calibration apparatus includes a first calibration apparatus and a second calibration apparatus; and
   the calibration member includes:
      a first calibration member configured to adjust a horizontal state of the first calibration apparatus; and
      a second calibration member configured to adjust a horizontal state of the second calibration apparatus.

13. The laser device having the laser calibration function according to claim 12, wherein:
   the first calibration member is configured to adjust the horizontal state of the laser device in an X-axis direction; and
   the second calibration member is configured to adjust the horizontal state of the laser device in a Y-axis direction.

14. The laser device having the laser calibration function according to claim 1, wherein the laser device is a laser line projector, a laser level, or a laser total station.

15. A calibration method for a laser device comprising:
   placing the laser device on a calibration platform, the laser device comprising a housing, a laser emission apparatus arranged in the housing, a calibration apparatus mechanically connected to the laser emission apparatus and including a transmission member;

driving, by a drive member, a calibration member to move from a first working position to a second working position to allow the calibration member to be coupled with the transmission member of the calibration apparatus;

based on a position of a laser emitted by the laser emission apparatus, determining a calibration amount of the laser device; and sending the calibration amount to the drive member, and driving, by the calibration member, the transmission member to rotate to automatically calibrate the laser device.

16. The calibration method according to claim 15, further comprising:

after a calibration in a first direction being completed, rotating the laser device a first angle to calibrate the laser device in a second direction, the first direction and the second direction being perpendicular with each other.

17. The calibration method according to claim 15, wherein the drive member is configured as a mechanical arm, and the calibration method further comprises:

performing, by the mechanical arm, automatic calibration on the laser device based on the calibration amount.

18. The calibration method according to claim 15, wherein the laser device further includes a level indication apparatus; and the calibration method further comprises:

performing, by the drive member, automatic calibration on the laser device based on the level indication apparatus.

* * * * *